United States Patent [19]

Appeldorn et al.

[11] Patent Number: 4,800,868
[45] Date of Patent: Jan. 31, 1989

[54] TILTED PANEL LINEAR ECHELON SOLAR COLLECTOR

[75] Inventors: Roger H. Appeldorn; Dennis F. Vanderwerf, both of St. Paul, Minn.

[73] Assignee: Minnesota Mining and Manufacturing Company, Saint Paul, Minn.

[21] Appl. No.: 564,351

[22] Filed: Dec. 22, 1983

Related U.S. Application Data

[63] Continuation of Ser. No. 084,526, Oct. 21, 1979, abandoned, which is a continuation of Ser. No. 880,183, Feb. 22, 1978, abandoned.

[51] Int. Cl.$^4$ .............................. F24J 2/10; F24J 2/08
[52] U.S. Cl. .................................. 126/438; 350/452; 126/440
[58] Field of Search ................... 126/438, 439, 440; 350/452, 292

[56] References Cited

U.S. PATENT DOCUMENTS

| | | | |
|---|---|---|---|
| 3,058,394 | 10/1962 | Edlin | 126/438 |
| 3,905,352 | 9/1975 | Jahn | 126/438 |
| 3,972,593 | 8/1976 | Appeldorn et al. | 350/452 |
| 3,982,527 | 9/1976 | Cheng et al. | 126/438 |
| 4,043,315 | 8/1977 | Cooper | 126/438 |
| 4,071,017 | 1/1978 | Russell, Jr. et al. | 350/292 |
| 4,082,433 | 4/1978 | Appeldorn | 350/452 |
| 4,108,540 | 8/1978 | Anderson et al. | 126/438 |
| 4,131,336 | 12/1978 | Frosch et al. | 126/438 |
| 4,136,671 | 1/1979 | Whiteford | 126/438 |
| 4,149,521 | 4/1979 | Fletcher et al. | 126/438 |
| 4,315,671 | 2/1982 | Bunch | 126/438 X |
| 4,385,808 | 5/1983 | Vanderwert | 350/452 |

Primary Examiner—Randall L. Green
Attorney, Agent, or Firm—Donald M. Sell; Stephen W. Buckingham

[57] ABSTRACT

A solar concentrator with wide effective aperture is disclosed, which comprises at least one linear echelon reflector element which is inclined with respect to the direction of incident solar radiation to direct incident solar radiation to a line focus.

1 Claim, 3 Drawing Sheets

TILTED PANEL LINEAR ECHELON SOLAR COLLECTOR

This is a continuation of application Ser. No. 084,526 filed Oct. 12, 1979, abandoned which is a continuation of application Ser. No. 880,183 filed Feb. 22, 1978, abandoned.

BACKGROUND OF THE INVENTION

(1) Field of the Invention

This invention relates to a solar concentrator for receiving and collecting incident solar radiation to a line focus.

(2) Description of the Prior Art

Liner Fresnel or echelon reflectors are being increasingly used for solar energy concentration because of the accuracy with which these optical surfaces may be mass produced. However, conventional prior art solar concentrators which incorporate such reflectors suffer from a number of defects. In the interests of intercepting as much incident solar radiation as possible, designers have adopted large apertures for solar collector systems. When the echelon reflector aperture becomes large relative to the focal distance of the reflector, the echelon surface loses efficiency due to a partial blockage of radiation directed toward the line focus by the riser steps of the echelon surface. Consequently, some portion of incident radiation which is intercepted by the echelon surface is not directed to the line focus. This causes a reduction in optical efficiency which is undesirable.

SUMMARY OF THE INVENTION

The present invention overcomes the deficiencies of the prior art by means of a novel reflector design which eliminates riser step blockage and results in a large aperture solar concentrator structure which may be used with conventional tracking apparatus to track the sun.

The echelon reflector structure of the present invention is formed in a thin polymeric sheet. The sheet has a smooth surface and a surface configured as an echelon reflector surface. The smooth surface of the sheet defines a planar base surface or base plane. The sheet is bonded to a flat base support structure which may be of conventional design. The surface configured as an echelon reflector structure comprises a plurality of reflective planar elements, each of which are inclined at its predetermined angle $\alpha'$ with respect to the planar base surface of the structure. The echelon reflector elements are separated by riser steps which extend substantially vertically from the planar base surface.

In operation the reflective planar elements receive incident radiation and direct this to a line focus. By inclining the echelon reflector structure at a minimum tilt angle $\phi$ with respect to a line normal (the normal) to the incident radiation, all riser step blockage is eliminated.

Two orthogonal X-Y coordinate systems are used to describe the geometric relationships between the echelon angles $\alpha'$ and the minimum tilt angle $\phi$ which results in the elimination of riser step blockage. The X-Y coordinate system has the X axis extending normal to the incident solar radiation and the Y axis extending vertically parallel to the incident radiation. The X'-Y' coordinate system has the X' axis extending along the planar base surface and the Y' axis extending normally thereto. The base plane is rotated such that the slope of the reflective planar element is negative in the X'-Y' coordinate system and positive with respect to the X-Y coordinate system. This slope change causes the riser steps to move out of the path of both incident and reflected radiation, thus eliminating all riser step blockage. The reflective planar element has a negative slope with respect to the X'-Y' coordinate system and is, therefore, defined as a negative angle with respect to this coordinate system. This geometric constraint which determines the minimum tilt angle $\phi$ required to achieve the elimination of riser step blockage requires that the quantity a be greater than or equal to zero and less than or equal to $\phi$.

A pair of these linear echelon reflector structures may then be arranged in a V shape. Each linear echelon reflector structure may be symmetrically arranged about the bisector of the vertex of the V shape. In this configuration each reflector structure will focus incident solar radiation to a line focus located along the bisector of the vertex of the V shape. The panels may be supported in the V-shaped structure by a rigid support frame. Although the design examples given here relate to the simple V-shaped configuration, it should be appreciated that other configurations are possible. For example, a multiplicity of contiguous panels may be used where each panel is oriented at a different tilt angle $\phi$. This allows larger effective apertures with no riser step blockage. This segmented configuration permits the individual segments to be held flat, and permits them to be individually tuned for focusing control.

The planar fose structure is required to permit reflector elements to accurate focus at the line focus. Accurate focus control requires that each echelon angle $\alpha'$ be oriented correctly with regard to the focus. An error of $\Delta\alpha'$ in the echelon angle gives a ray deviation of d (FIG. 3). The magnitude of $d = D\Delta\theta$ (FIG. 3). The echelon angle errors $\Delta\alpha'$ may arise from inaccuracies in master cutting, deviations from panel flatness and errors in the panel orientation. To a good approximation the displacement of the ray in a direction normal to the ray near the focal point is $d = D\Delta\theta$, where D is the distance from the reflecting echelon to the focal point. This causes a focus spreading or defocusing near the line receiver. The magnitude of this defocusing depends upon the distance from the line focus to the echelon reflector. Inclining the panel with respect to the incident radiation not only eliminates riser step blockage, but also advantageously reduces the average distance variation of each step from the focus. Consequently, inclining the panel with respect to the incident radiation permits one to achieve better focus control.

The individual reflective planar elements are separated by riser steps which, as illustrated, are substantially perpendicular to the base plane. The reflective planar surface is inclined at angle $\alpha$ with respect to the X-Y coordinate system to direct incident radiation toward the line focus. Inclination of the base plane with respect to the direction of the X-Y coordinate system permits riser steps to be out of the path of both the incident and reflected radiation such that no incident or reflected radiation will strike the riser steps.

The planar reflector surfaces may be configured as either a first surface reflector or a second surface reflector. However, an additional correction must be made to compensate for refraction at the transparent planar surface of the second surface embodiment.

In the case of the first surface reflector embodiment, the geometrical constraint which eliminates riser step blockage through slope reversal of the planar reflective surfaces requires that $\phi \geq \alpha \geq 0$, or $-\phi \leq \alpha' \leq 0$ where $\alpha' = \alpha - \phi$.

In the case of the second surface reflector embodiment the geometrical constraint which eliminates riser step blockage through slope reversal requires that $\phi \geq \alpha > 0$, or $-\phi \leq \alpha' < 0$, where $\alpha' = \alpha - \phi$. The fact that $\alpha$ is always greater than zero results from the refraction at the transparent surface of this embodiment.

The use of the second surface reflectors permits the reflective surface to be protected from environmental weathering since the only exposed surface is the planar plastic surface of the reflector structure. Appropriate weather protecting surfaces may be applied to the polymeric planar surface to prevent weathering and degradation of this optical surface.

DESCRIPTION OF THE PREFERRED EMBODIMENTS

Figure 1:
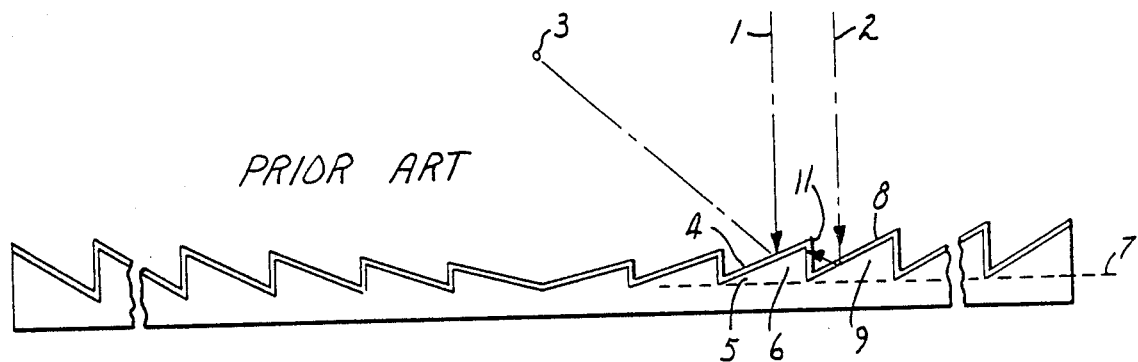
FIG. 1 shows a schematic elevational view of a non-tilted conventional linear echelon reflector for directing light to a focus.

Referring to FIG. 1 which shows a non-tilted prior art linear echelon reflector for directing light rays 1 and 2 to a line focus 3. Incident light ray 1 strikes the reflective surface 4 of an echelon reflector 6 which is inclined with respect to the base line 7 of the echelon reflector elements at an angle 5. This angle is appropriately selected to direct the incident light ray to the focus 3. An incident ray 2 striking an adjacent echelon reflector surface 9 is reflected by the reflective surface 8 in the correct direction to reach line focus 3; however, the reflected ray is intercepted by the riser step 11 which separates echelon reflector surfaces 4 and 8. It should be clear by inspection of FIG. 1 that this riser step blockage becomes progressively more severe in the case of echelon reflector surfaces located greater distances from the focus. Incident radiation which is blocked by the riser steps does not reach the focus, and consequently, reduces the optical efficiency of the solar collector system. Inclining such a linear echelon reflector system with respect to the focus does not improve the optical performance since incident rays will first strike the riser surfaces and be redirected toward the sky.

Figure 2:
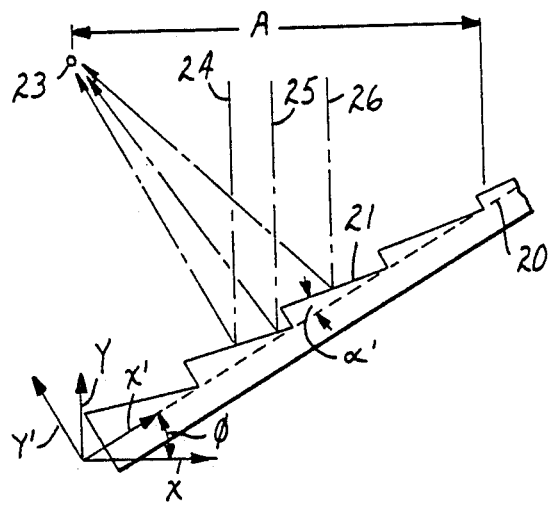
FIG. 2 shows a schematic elevational view of applicants' invention defining the coordinate system used in describing the geometry of applicants' invention.

In applicants' invention shown in FIG. 2 each echelon angle $\alpha'$ formed as the inclined angle between base plane 20 and the planar reflector surface 21. This angle $\alpha'$ faces the tilt angle $\phi$ which is formed between the base plane 20 and the x-axis, which is normal to the direction of the incident solar radiation. In discussing the orientation of the plana reflector surfaces, it is useful to define two coordinate systems. In the coordinate system X-Y, the planar reflector surface has a positive slope. When the slope of the planar reflector surface 21 is considered in the X'-Y' coordinate system, the slope of the reflector surface is reversed with respect to the X-Y coordinate system, which permits every incident light ray striking the reflective surface of planar reflector element 21 to be directed to a line focus 23 without riser step blockage. For a given collecting aperture A, the minimum tilt angle $\phi$ is that tilt angle which results in positive slope for all planar reflector surfaces in the X-Y coordinate system while directing incident light from each planar reflector surface to the line focus 23. As shown in FIG. 2, incident radiation rays 24, 25 and 26 are always directed toward the line focus and the riser portion separating each planar reflector surface never intercepts incident or reflected solar radiation.

Figure 3:
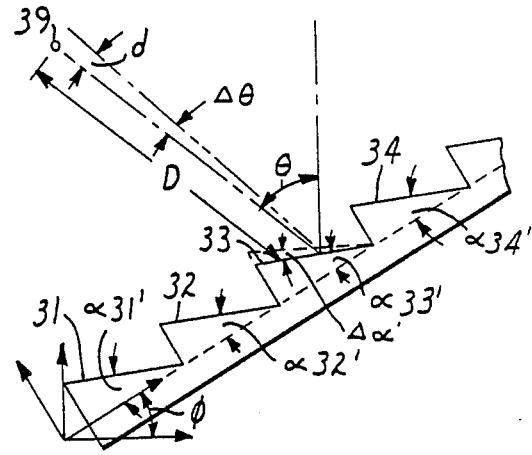
FIG. 3 is a schematic elevational view of applicants' invention describing the control of focusing error of applicants' invention.

A further advantage of the inclined linear echelon reflector structure described with reference to FIG. 3 results in improved focus control of the solar concentrators. The angle $\alpha'$ corresponding to each of the planar reflector elements 31, 32, 33, 34 is $\alpha'_{31}$, $\alpha'_{32}$, $\alpha'_{33}$, $\alpha'_{34}$, $\alpha'_{35}$. These angles are designed to direct incident solar radiation to a line focus 39 when the panel is tilted at the minimum angle $\phi$. Deviations in this echelon angle $\Delta \alpha'$ for any $\alpha'$ may be caused by inaccuracies in master cutting, deviations from panel flatness and errors in panel orientation. The angle $\theta$ as shown in FIG. 3 is the angle between the incident solar radiation and the solar radiation being reflected to the line focus. These deviations will cause a ray to be misdirected $\Delta \theta$ slightly from the focus. The amount of this defocusing d is given to a good approximation by $d = D \Delta \theta$, where D is the distance from the reflecting surface 33 to the focal point 39. The inclined configuration of applicants' invention minimizes the average variation in distances D from each of the planar reflector surfaces to the focus 39, over the aperture of the echelon reflector structure. Consequently, the defocusing variation is less severe across the aperture of applicants' tilted echelon reflector structure. This permits closer control over line focus spread which is advantageous when a line receiver located at line focus 39 has an efficiency which depends strongly upon the energy flux which it receives.

Figure 4:
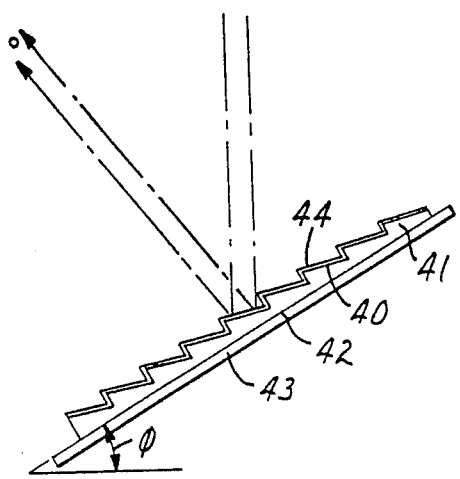
FIG. 4 is a schematic elevational view of applicants' invention embodying a first surface linear echelon reflector.
Figure 5:
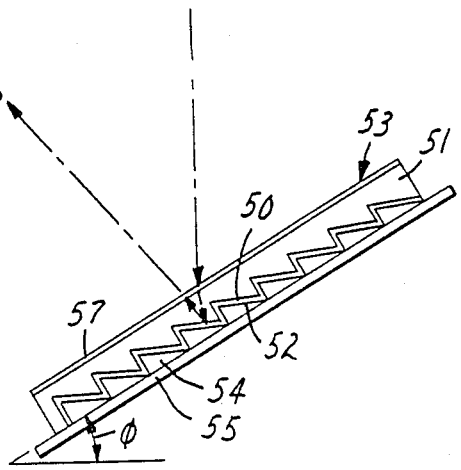
FIG. 5 is a schematic elevational view of applicants' invention embodying a second surface linear echelon reflector.

FIGS. 4 and 5 show first and second surface embodiments of applicants' invention. Referring to FIG. 4, the planar reflective surfaces such as 40 are formed in a polymeric material 41. This sheeting may be bonded by means of an adhesive 42, such as an acrylic adhesive, such as embodied in an acrylic transfer type, e.g. Scotch Brand No. 415 acrylic transfer tape as manufactured by Minnesota Mining and Manufacturing Company, St. Paul, Minn., to a flat panel 43. A suitable reflective coating 44 is applied to the exposed surface of the planar reflector structures. The completed reflector structure is inclined at a tilt angle $\phi$ with respect to the normal of the direction of the incident solar radiation.

Referring to FIG. 5, a second surface embodiment of the present invention is shown. In this embodiment, the planar reflector surfaces such as 50 are formed on the underside of a transparent polymeric sheet 51. A suitable reflective coating 52 is applied to create a reflective surface. The reflective panel structure 53 thus formed is bonded by a suitable means 54 to a flat support panel 55. The principal advantage of the second surface reflector as shown in FIG. 5 is that a smooth planar surface 57 is exposed to the environment and the reflective coating 52 can be protected from the environment. The smooth surface may be coated with a suitable abrasion resistant coat or antireflective coating.

Figure 6:
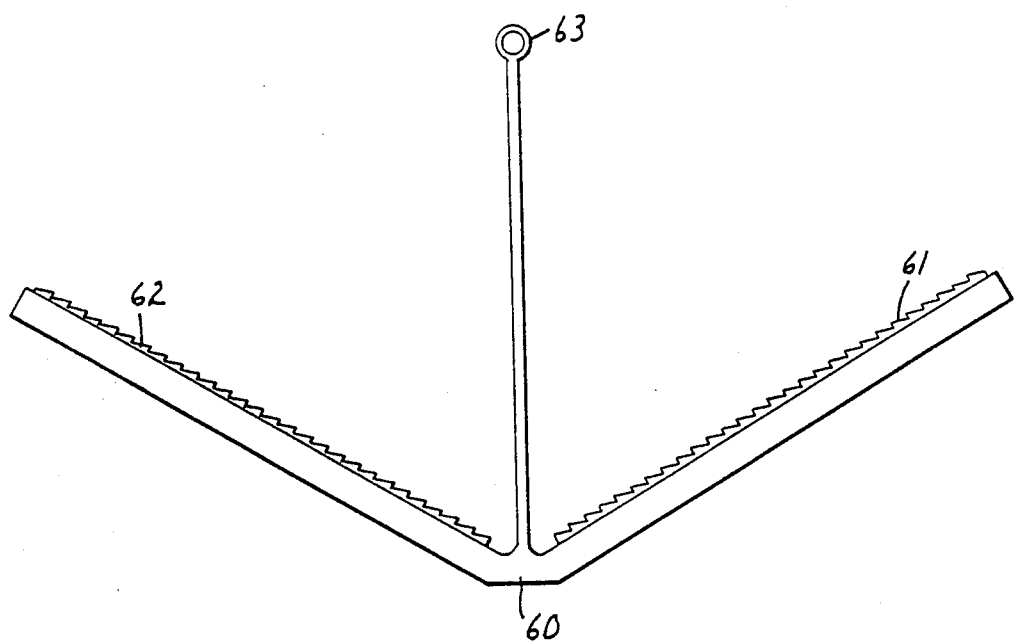
FIG. 6 is a schematic elevational view of one embodiment of applicants' invention showing the support structure for the echelon reflector optics.

One suitable support structure for applicants' reflector concentrators is shown in FIG. 6, wherein a rigid support structure 60 is provided to align the reflector panels 61 and 62 with respect to the line receiver 63. Although the reflector elements shown in the drawing is of the first surface type, it should be appreciated that the rigid support structure may be used for the second surface reflector embodiment as well.

Figure 7:
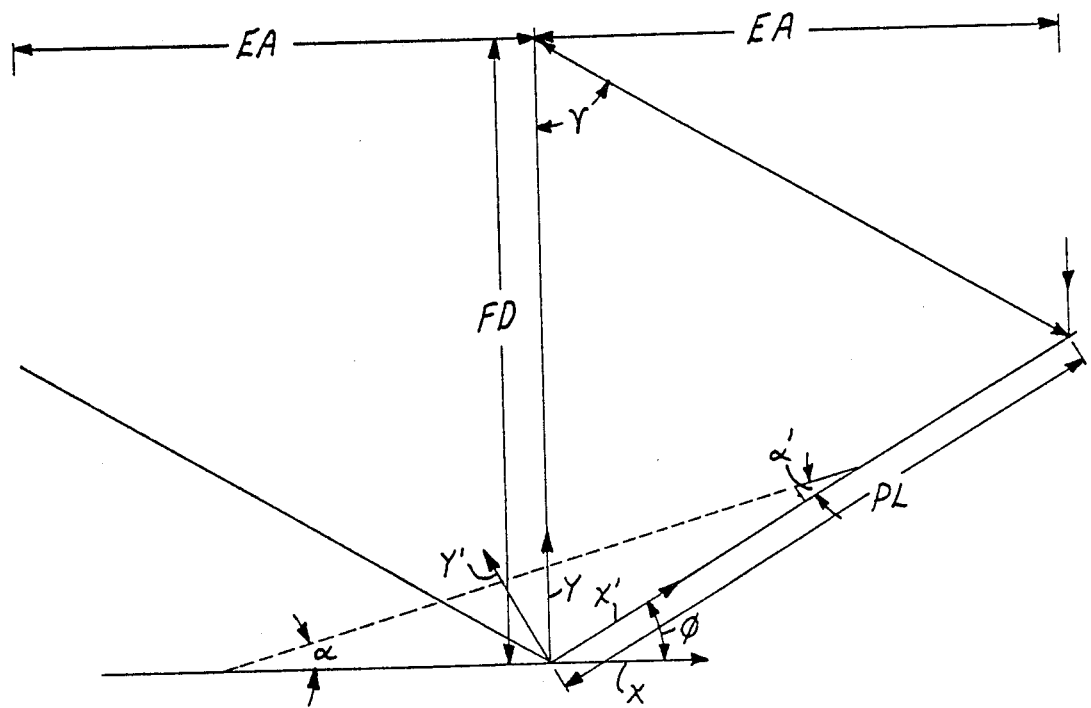
FIG. 7 is a schematic elevational view of a specific example of applicants' invention defining geometrical parameters used in discussing the collector efficiency.

FIG. 7 refers to a specific design example, for a first surface reflector panel. The solar energy absorber or receiver is placed at the line focus of the solar collector which is located a distance FD away from the vertex of the panels. The receiver may be of any conventional type including photovoltaic cells or heat absorbing pipe. The half acceptance angle $\gamma$ at the receiver or absorber is chosen by the designer, depending upon the type of solar absorber the designer wishes to focus incident solar radiation upon, the half acceptance angle determining the amount of, or horizontal area over which, the incident solar radiation which may be collected or focused. Once the half acceptance angle is determined, the minimum tilt angle $\phi$ of the panel which results in no riser step blockage may be determined by $\phi = \gamma/2$. The required panel length PL may then be calculated by $$PL = \frac{\sine(\gamma)}{\cos(\phi)} \times FD.$$

The effective aperture of the total solar collector then becomes EA=PL×cos $\phi$. For the specific case described FD=48 inches, PL=48 inches, $\phi$=30°, $\gamma$=60° and EA=41.57 inches. The following table gives representative values of X', $\alpha'$ and $\alpha$, where $\alpha$ is the angle of planar reflector elements in the X-Y coordinate system and X' is the position of each planar reflective element along the panel.

| X' | $\alpha$ | $\alpha'$ |
|---|---|---|
| 0.05 | 0.02 | −29.97 |
| 4.05 | 2.18 | −27.81 |
| 9.05 | 5.10 | −24.89 |
| 14.05 | 8.26 | −21.73 |
| 19.05 | 11.60 | −18.39 |
| 24.05 | 15.03 | −14.96 |
| 29.05 | 18.46 | −11.53 |
| 33.05 | 21.14 | −8.85 |
| 38.05 | 24.33 | −5.66 |
| 43.05 | 27.31 | −2.68 |
| 47.95 | 29.97 | −0.02 |

A flat panel design ($\phi$=0°) of the same equivalent aperture and focal distance has a calculated loss due to echelon riser step blockage of 9.2 percent (RMS value over all reflecting steps). The tilted panel is therefore about nine percent more efficient than the flat panel.

Figure 8:
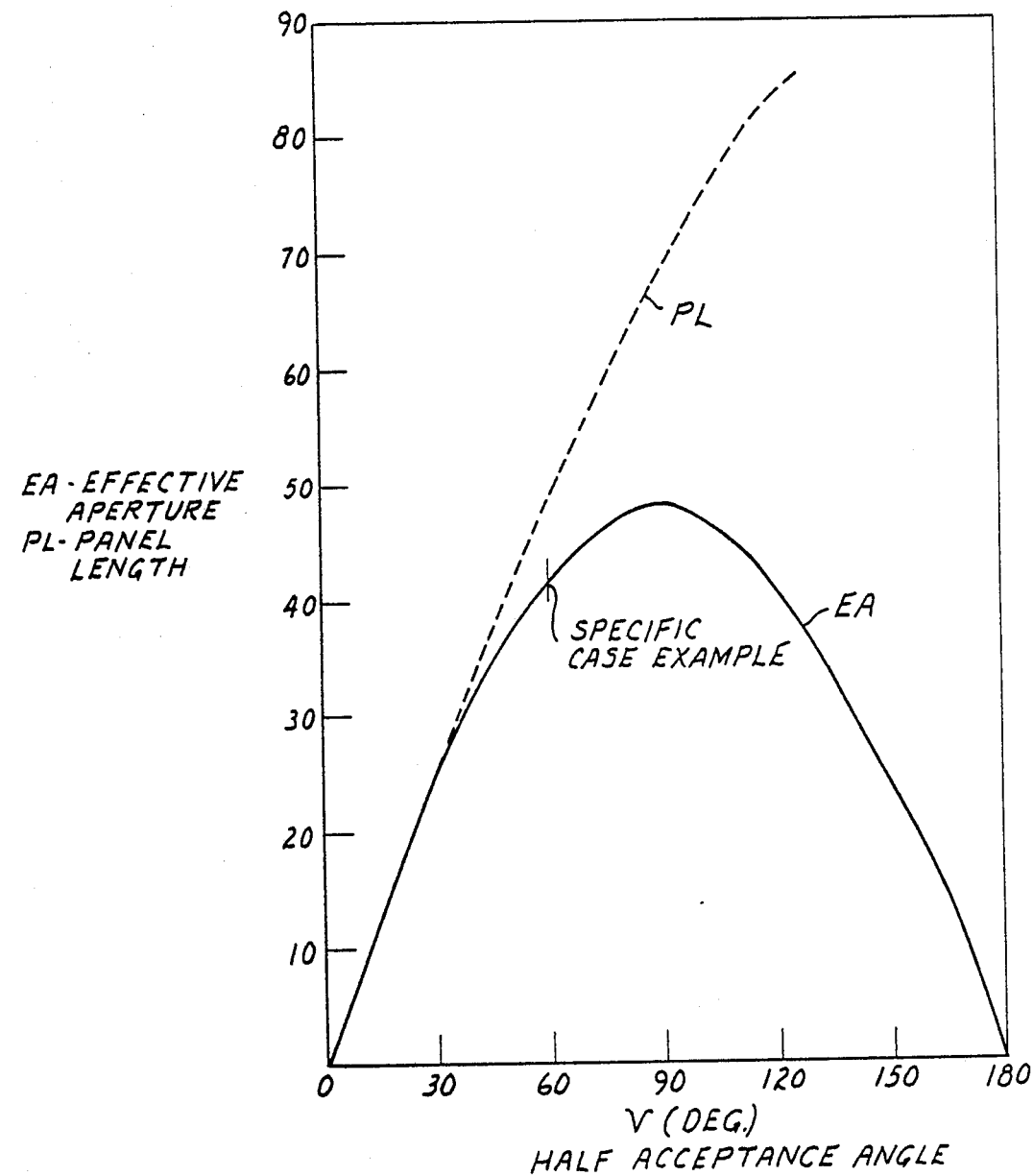
FIG. 8 is a graphical representation of effective aperture and panel length as a function of half acceptance angle.

FIG. 8 is a graph showing the effect of the half acceptance angle upon the panel length and effective aperture of the solar collector with a focal distance of 48 inches. Although it can be seen from the graph that half acceptance angles between 0° and 180° are theoretically possible with zero step blockage, the effective aperture of the solar collector drops off to sero near these values. The specific case given in the table of values and in FIG. 7 is marked on the graph. It can be seen from the graph that the larger the half acceptance angle, the greater the requisite panel length to achieve a given effective aperture. However, a half acceptance angle of 90° is practically obtainable. This is impossible to achieve with a non-tilted panel.

As mentioned previously, to obtain larger effective apertures or acceptance angles, several contiguous panels may be individually tilted, using the design principles of the present invention. This arrangement eliminates riser step blockage, panel flatness control is improved, and the panels may be individually aligned.

Also, in some instances, some riser step blockage may be allowed beyond the edge of applicants' novel reflector panel, where it is of low magnitude because of the use of applicants' invention. This allows one to achieve a higher aperture or acceptance angle.

What is claimed is:

1. A solar concentrator for directing incident solar radiation to a linear focus, comprising:
    a planar base surface being positioned at an angle $\phi$, which is greater that 0° but less than 90°, with respect to a direction which is normal to said incident solar radiation;
    a plurality of planar reflective elements set along said planar base surface each of which is positioned at an angle $\alpha'$ with respect to said planar base surface and which varies for each of said planar reflective elements to reflect said incident solar radiation to said linear focus, said plurality of planar reflective elements being separated from each other by substantially planar riser elements, said riser elements being substantially normal to said planar base surface, each of said planar reflective elements making an angle $\alpha$ with respect to said direction which is normal to said incident solar radiation;
    wherein the magnitude of said angle $\alpha$ for each of said planar reflective elements is not more than the magnitude of said $\alpha$ for said planar base surface;
    wherein the magnitude of said angle $\alpha'$ of each of said plurality of planar reflective elements decreases for said planar reflective elements which are positioned away from a point at which a line drawn parallel to said incident solar radiation through said linear focus intersects said planar base surface;
    whereby all of said incident solar radiation is directed to said linear focus.

* * * * *